US012809660B2

(12) United States Patent

Layouni et al.

(10) Patent No.: US 12,809,660 B2

(45) Date of Patent: Nov. 24, 2026

(54) REMOTE DEVICE ATTESTATION FOR OPERATING SYSTEMS IMPLEMENTING ADDRESS SPACE LAYOUT RANDOMIZATION

(71) Applicant: GM Global Technology Operations LLC, Detroit, MI (US)

(72) Inventors: Mohamed A. Layouni, Fraser, MI (US); Brian Farrell, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 357 days.

(21) Appl. No.: 18/751,686

(22) Filed: Jun. 24, 2024

(65) Prior Publication Data

US 2025/0390326 A1 Dec. 25, 2025

(51) Int. Cl.
*G06F 9/455* (2018.01)
*G06F 8/61* (2018.01)

(52) U.S. Cl.
CPC ............ *G06F 9/45558* (2013.01); *G06F 8/61* (2013.01); *G06F 2009/45579* (2013.01); *G06F 2009/45583* (2013.01); *G06F 2009/45587* (2013.01)

(58) Field of Classification Search
CPC ............................... G06F 9/45558; G06F 8/61
See application file for complete search history.

(56) References Cited

U.S. PATENT DOCUMENTS 10,284,592 B1 * 5/2019 Powers ................... G06F 21/14
10,412,116 B1 * 9/2019 Powers ............... G06F 9/44505
10,554,685 B1 * 2/2020 McArdle ............. H04L 63/0272
11,601,434 B1 * 3/2023 Hornsby ............. G06F 9/45558
11,734,418 B1 8/2023 Epstein
2012/0297057 A1 * 11/2012 Ghosh ................. G06F 9/45558 709/224
2013/0091318 A1 * 4/2013 Bhattacharjee ....... G06F 12/145 711/6
2015/0261576 A1 * 9/2015 Gong .................. G06F 9/45558 711/6
2016/0021142 A1 * 1/2016 Gafni .................. G06F 9/45558 726/23
2016/0171212 A1 * 6/2016 Majumdar .............. G06F 21/71 713/164
2016/0299765 A1 * 10/2016 Wesie ................. G06F 9/45558
(Continued)

*Primary Examiner* — Oleg Korsak
(74) *Attorney, Agent, or Firm* — Vivacqua Crane, PLLC

(57) ABSTRACT

A remote device attestation (RDA) system for operating systems (OSs) implementing address space layout randomization (ASLR) includes an ASLR mechanism for RDA. The ASLR mechanism has a secure trust zone (TZ) with a secure OS and trusted applications (TAs), and a non-secure world. The non-secure world includes: virtual controllers in communication with the TZ and with control systems of a vehicle. A hypervisor (HV) application of the non-secure world communicates with the OS and TAs in the TZ. The ASLR mechanism verifies integrity of applications running in the non-secure world on a first time installation, or a first start-up, verifies integrity of the applications running in the non-secure world during an update to the applications, and actively and automatically verifies integrity of applications running in the non-secure world during application use. When integrity verification fails, the ASLR mechanism prevents applications that have failed verification from operating for vehicle control.

20 Claims, 7 Drawing Sheets

(56) References Cited

U.S. PATENT DOCUMENTS

| | | | | |
|---|---|---|---|---|
| 2016/0321093 | A1* | 11/2016 | Bathen | G06F 9/45558 |
| 2017/0024313 | A1* | 1/2017 | Tsirkin | G06F 21/52 |
| 2018/0004442 | A1* | 1/2018 | Hnanícek | G06F 3/0619 |
| 2018/0004953 | A1* | 1/2018 | Smith II | H04L 9/3268 |
| 2018/0095900 | A1* | 4/2018 | Sarangdhar | G06F 13/1668 |
| 2018/0211017 | A1* | 7/2018 | Homescu | G06F 21/14 |
| 2018/0239620 | A1* | 8/2018 | Tsirkin | G06F 9/4843 |
| 2018/0239624 | A1* | 8/2018 | Tsirkin | G06F 9/445 |
| 2019/0155743 | A1 | 5/2019 | Loreskar et al. | |
| 2019/0179767 | A1* | 6/2019 | Tsirkin | G06F 9/5077 |
| 2020/0244692 | A1* | 7/2020 | Shua | G06F 11/1451 |
| 2023/0098117 | A1* | 3/2023 | Wang | G06F 12/1475<br>726/23 |
| 2025/0085996 | A1* | 3/2025 | Suman | G06F 9/45558 |
| 2025/0190566 | A1* | 6/2025 | Wang | G06F 21/556 |

* cited by examiner

REMOTE DEVICE ATTESTATION FOR OPERATING SYSTEMS IMPLEMENTING ADDRESS SPACE LAYOUT RANDOMIZATION

INTRODUCTION

The present disclosure relates to systems and methods for ensuring software security, and more specifically to systems and methods for remote device attestation (RDA) in systems utilizing systems-on-chip (SoCs) implementing address space layout randomization (ASLR). Software and hardware updates to systems, including vehicles and other such hardware, may be compromised or modified out of original equipment manufacturer (OEM) specifications. Therefore, in order to ensure that updated systems are functioning properly, maintaining security of software and hardware, verifying that devices have not been compromised, and that software running on devices has not been modified is important. RDA verifies that hardware and/or software on a remote device has not been tampered with. In microcontrollers (MCUs) software is written to specific memory locations defined in a configuration file, and the content in specific regions of memory can be compared to a reference held by an OEM through known RDA processes.

However, in SoCs an operating system installed chooses where files are installed without the OEM system knowing this information. Accordingly, while current systems and method for managing software and hardware updates to vehicles achieve their intended purpose, there is a need for a new and improved system and method for managing software and hardware updates that utilize existing infrastructure, to securely manage devices and device updates while providing for secure verification or attestation of software and hardware updates in both MCU and SoC applications, while maintaining or decreasing system and method complexity.

SUMMARY

According to several aspects, a system for remote device attestation (RDA) for operating systems implementing address space layout randomization (ASLR) includes: one or more controllers of a client, each of the one or more controllers having a processor, a memory, and input/output (I/O) ports, and one or more remote servers. Each of the one or more remote servers has a processor, a memory, and I/O ports. The I/O ports of the one or more controllers are in communication with the one or more I/O ports of the one or more remote servers. The memories of the each of the one or more controllers and the one or more remote servers stores programmatic control logic including an ASLR application or mechanism for RDA. The ASLR mechanism or application includes: a trust zone (TZ) defining a secure area and having a secure operating system (OS) and one or more trusted applications (TAs), and a non-secure world. The non-secure world includes: one or more virtual controllers, each having memory, processors, and I/O ports, the I/O ports of the non-secure world in communication with the TZ, and with one or more control systems of a vehicle. The non-secure world further includes a hypervisor (HV) application in communication with the OS and TAs in the TZ. The ASLR mechanism or application further includes at least first, second, and third control logics. The first control logic verifies integrity of applications running in the non-secure world on a first time installation, or a first start-up. The second control logic verifies integrity of the applications running in the non-secure world during an update to the applications. The third control logic actively and automatically verifies integrity of applications running in the non-secure world during application use. When integrity verification fails, the ASLR application or mechanism prevents the applications that have failed integrity verification from operating for vehicle motion control (VMC), advanced driver assistance system (ADAS) functionality, and navigation control from executing, thereby diminishing vehicle function.

In another aspect of the present disclosure the first control logic further includes control logic for bypassing ASLR and for receiving in a trusted environment of an original equipment manufacturer (OEM), via a wired or wireless connection by the one or more controllers of the client, an installation package. The installation package includes one or more TAs in the TZ receive memory layouts of a guest OS, memory layout of the HV application, memory layouts of boot loaders and memory layouts of applications from the guest OS. The first control logic further includes control logic for causing the TA to trust the installation package because the installation package was received in a trusted OEM controlled environment, and control logic for executing or running for a first time the installation package and randomizing a memory layout of the one or more controllers of the client during execution of the installation package.

In another aspect of the present disclosure the first control logic further includes control logic for storing a module identifier, a filename, and physical addresses of program files resulting from execution of the installation package on the one or more controllers of the client. The first control logic further includes control logic for querying a hypervisor bootloader (HV BL) of the HV application to obtain content of specified physical address ranges, or sets of filenames and module identifiers, and control logic for computing a message digest (MD) of retrieved content of specified physical address ranges, sets of filenames and module identifiers, and storing in memory the MD with a corresponding module identifier or filename.

In another aspect of the present disclosure the second control logic further includes control logic for receiving, through a wired downloadable content or data link connector (DLC) or wireless over-the-air (OTA) connection via the I/O ports of the one or more controllers of the client, a software update. The software update includes applications updated to add new features and/or functionality, or applications updated to adapt existing software to new or different physical hardware, or applications updated to address software or hardware vulnerabilities. The second control logic further includes control logic for causing the HV BL to launch a guest OS bootloader (guest OS BL) to load guest OS software from flash memory to random-access memory (RAM). The second control logic further includes control logic for sending physical addresses of loaded HV software, including module identifiers and filenames, to the TA in the TZ; and for sending guest OS BL addresses of loaded guest OS software including module identifiers and filenames to the TA in the TZ; and for sending from the guest OS physical addresses of loaded applications including module identifiers and filenames to the TA in the TZ.

In another aspect of the present disclosure the second control logic further includes control logic for comparing information received from the HV BL, from the guest OS BL, and from the guest OS to information in a signed manifest file. The signed manifest file includes a listing of modules, filenames, and applications packaged in the software update. The second control logic further executes control logic for storing physical addresses of modules, filenames, and applications to memory when a comparison of the signed manifest file and the information received from the HV BL, from the guest OS BL, and from the guest OS is successful. The second control logic further includes control logic for computing MDs of retrieved memory content and comparing the MDs to reference MDS stored in the signed manifest file. When the comparison between the information in received from the HV BL, guest OS BL and guest OS to the signed manifest file is not successful, the system refuses the software update.

In another aspect of the present disclosure the second control logic further includes control logic for causing the guest OS in the non-secure world to query the TA in the TZ for a random seed or seed numbers for an ASLR permutation, and control logic for causing the TA in the TZ to utilize a reference MD from the first time running of the installation package or from the OEM signed manifest file in a verified software update to selectively accept the query. The TA in the TZ utilizes a random seed or seed numbers to generate random permutations $\pi$ and an inverse $\pi^{-1}$ of the permutations. Randomization of virtual locations of installed modules and filenames is based on the random permutations, such that physical locations are equal to the inverse $\pi^{-1}$ of runtime locations.

In another aspect of the present disclosure the second control logic further includes control logic for querying the non-secure world for memory content at physical locations identified, and control logic for comparing a MD of retrieved content to stored reference MD information. When the system does not receive a response, or the MD of a response from the non-secure world does not match the reference MD, the TA in the TZ refuses to let code in the non-secure world request operations that utilize TZ keys, and the TA in the TZ requests the HV application to reset the guest OS, or requests the guest OS to reset a compromised application. When the system receives a correct response, the TA in the TZ allows the code in the non-secure world to request operations that utilize TZ keys.

In another aspect of the present disclosure the third control logic further includes control logic for accessing a reference MD from a first install or from the OEM signed manifest file, and control logic for causing the TA in the TZ to query the guest OS BL or the guest OS in the non-secure world for the ASLR permutation $\pi$. The third control logic further includes control logic for causing the TA in the TZ to use the inverse permutation $\pi^{-1}$ to determine runtime physical locations where modules, module identifiers and filenames are written, and control logic for querying the non-secure world for an MD on relevant physical memory locations. The third control logic further includes control logic for comparing the reference MD from the first install or from the OEM signed manifest file to the MD from the non-secure world.

In another aspect of the present disclosure when the TA in the TZ receives no response or a response that does not match the reference MD or the OEM signed manifest file, the TA refuses to allow code in the non-secure world to request operations that utilize TZ keys, and the TA requests the HV application to reset the guest OS or request the guest OS to reset a compromised application or app running within the guest OS.

In another aspect of the present disclosure when the HV application is unable to reset the guest OS or request the guest OS to reset a compromised application or app running within the guest OS, the TZ resets to OEM specifications the one or more controllers running the HV application based on reference software configurations stored in the TZ.

In another aspect of the present disclosure a method for remote device attestation (RDA) for operating systems implementing address space layout randomization (ASLR) includes utilizing one or more controllers of a client, each of the one or more controllers having a processor, a memory, and input/output (I/O) ports. The method further includes utilizing one or more remote servers, each of the one or more remote servers having a processor, a memory, and I/O ports, the I/O ports of the one or more controllers in communication with the one or more I/O ports of the one or more remote servers, the memories of the each of the one or more controllers and the one or more remote servers storing programmatic control logic, including an ASLR mechanism or application for RDA. The ASLR mechanism or application includes a trust zone (TZ) defining a secure area and having a secure operating system (OS) and one or more trusted applications (TAs); and a non-secure world. The non-secure world includes one or more virtual controllers, each having memory, processors, and I/O ports, the I/O ports of the non-secure world in communication with the TZ, and with one or more control systems of a vehicle. The non-secure world further includes a hypervisor (HV) application in communication with the OS and TAs in the TZ. The ASLR mechanism further includes a first control logic for verifying integrity of applications running in the non-secure world on a first time installation, or a first start-up, a second control logic for verifying integrity of the applications running in the non-secure world during an update to the applications, and a third control logic for actively and automatically verifying integrity of applications running in the non-secure world during application use. When integrity verification fails, the ASLR mechanism or application prevents the applications that have failed integrity verification from operating for vehicle motion control (VMC), advanced driver assistance system (ADAS) functionality, and navigation control from executing, thereby diminishing vehicle function.

In another aspect of the present disclosure the method further includes bypassing ASLR and receiving in a trusted environment of an original equipment manufacturer (OEM), via a wired or wireless connection by the one or more controllers of the client, an installation package including: having one or more TAs in the TZ receive memory layouts of a guest OS, memory layout of the HV application, memory layouts of boot loaders and memory layouts of applications from the guest OS. The method further includes causing the TA to trust the installation package because the installation package was received in a trusted OEM controlled environment, and executing or running for a first time the installation package and randomizing a memory layout of the one or more controllers of the client during execution of the installation package.

In another aspect of the present disclosure the method further includes storing a module identifier, a filename, and physical addresses of program files resulting from execution of the installation package on the one or more controllers of the client, and querying a hypervisor bootloader (HV BL) of the HV application to obtain content of specified physical address ranges, or sets of filenames and module identifiers. The method further includes computing a message digest (MD) of retrieved content of specified physical address ranges, sets of filenames and module identifiers, and storing in memory the MD with a corresponding module identifier or filename.

In another aspect of the present disclosure the method further includes receiving, through a wired downloadable content or data link connector (DLC) or wireless over-the-air (OTA) connection via the I/O ports of the one or more controllers of the client, a software update. The software update includes applications updated to add new features and/or functionality, or applications updated to adapt existing software to new or different physical hardware, or applications updated to address software or hardware vulnerabilities. The method further includes causing the HV BL to launch a guest OS bootloader (guest OS BL) to load guest OS software from flash memory to random-access memory (RAM), and sending physical addresses of loaded HV software, including module identifiers and filenames, to the TA in the TZ; and for sending guest OS BL addresses of loaded guest OS software including module identifiers and filenames to the TA in the TZ; and for sending from the guest OS physical addresses of loaded applications including module identifiers and filenames to the TA in the TZ.

In another aspect of the present disclosure the method further includes comparing information received from the HV BL, from the guest OS BL, and from the guest OS to information in a signed manifest file. The signed manifest file includes a listing of modules, filenames, and applications packaged in the software update. The method further includes storing physical addresses of modules, filenames, and applications to memory when a comparison of the signed manifest file and the information received from the HV BL, from the guest OS BL, and from the guest OS is successful, and computing MDs of retrieved memory content and comparing the MDs to reference MDS stored in the signed manifest file. When the comparison between the information in received from the HV BL, guest OS BL and guest OS to the signed manifest file is not successful, refusing the software update.

In another aspect of the present disclosure the method further includes causing the guest OS in the non-secure world to query the TA in the TZ for a random seed or seed numbers for an ASLR permutation, and causing the TA in the TZ to utilize a reference MD from the first time running of the installation package or from the OEM signed manifest file in a verified software update to selectively accept the query. The TA in the TZ utilizes a random seed or seed numbers to generate random permutations $\pi$ and an inverse $\pi^{-1}$ of the permutations. Randomization of virtual locations of installed modules and filenames is based on the random permutations, such that physical locations are equal to the inverse $\pi^{-1}$ of runtime locations.

In another aspect of the present disclosure the method further includes querying the non-secure world for memory content at physical locations identified, and comparing a MD of retrieved content to stored reference MD information. Upon not receiving a response, or upon receiving an MD of a response from the non-secure world that does not match the reference MD, the method causes the TA in the TZ to refuse to let code in the non-secure world request operations that utilize TZ keys, and the TA in the TZ requests the HV application to reset the guest OS, or requests the guest OS to reset a compromised application. Upon receiving a correct response, the method causes the TA in the TZ to allow the code in the non-secure world to request operations that utilize TZ keys.

In another aspect of the present disclosure the method further includes accessing a reference MD from a first install or from the OEM signed manifest file, and causing the TA in the TZ to query the guest OS BL or the guest OS in the non-secure world for the ASLR permutation $\pi$. The method further includes causing the TA in the TZ to use the inverse permutation $\pi^{-1}$ to determine runtime physical locations where modules, module identifiers and filenames are written, querying the non-secure world for an MD on relevant physical memory locations, and comparing the reference MD from the first install or from the OEM signed manifest file to the MD from the non-secure world.

In another aspect of the present disclosure the method further includes upon receiving no response or a response that does not match the reference MD or the OEM signed manifest file, refusing, by the TA in the TZ, to allow code in the non-secure world to request operations that utilize TZ keys, and causing the TA to request the HV application to reset the guest OS or request the guest OS to reset a compromised application or app running within the guest OS. The method further includes causing the TZ to reset the one or more controllers running the HV application based on reference software configurations stored in the TZ when the HV application is unable to reset the guest OS or request the guest OS to reset a compromised application or app running within the guest OS.

In another aspect of the present disclosure the method further includes a method for remote device attestation (RDA) for operating systems implementing address space layout randomization (ASLR). The method includes utilizing one or more controllers of a client, each of the one or more controllers having a processor, a memory, and input/output (I/O) ports, and utilizing one or more remote servers. Each of the one or more remote servers has a processor, a memory, and I/O ports, the I/O ports of the one or more controllers in communication with the one or more I/O ports of the one or more remote servers, the memories of the each of the one or more controllers and the one or more remote servers storing programmatic control logic, including an ASLR mechanism or application for RDA. The ASLR mechanism or application includes a trust zone (TZ) defining a secure area and having a secure operating system (OS) and one or more trusted applications (TAs), and a non-secure world. The non-secure world further includes one or more virtual controllers, each having memory, processors, and I/O ports, the I/O ports of the non-secure world in communication with the TZ, and with one or more control systems of a vehicle, and a hypervisor (HV) application in communication with the OS and TAs in the TZ. The ASLR mechanism or application verifies integrity of applications running in the non-secure world on a first time installation, or a first start-up; verifies integrity of the applications running in the non-secure world during an update to the applications; and actively and automatically verifies integrity of applications running in the non-secure world during application use. When integrity verification fails the ASLR mechanism prevents the applications that have failed integrity verification from operating for vehicle motion control (VMC), advanced driver assistance system (ADAS) functionality, and navigation control from executing, thereby diminishing vehicle function. The method further includes bypassing ASLR and for receiving in a trusted environment of an original equipment manufacturer (OEM), via a wired or wireless connection by the one or more controllers of the client, an installation package including: having one or more TAs in the TZ receive memory layouts of a guest OS, memory layout of the HV application, memory layouts of boot loaders and memory layouts of applications from the guest OS, and causing the TA to trust the installation package because the installation package was received in a trusted OEM controlled environment. The method further includes executing or running for a first time the installation package and randomizing a memory layout of the one or more controllers of the client during execution of the installation package, and storing a module identifier, a filename, and physical addresses of program files resulting from execution of the installation package on the one or more controllers of the client. The method further includes querying a hypervisor bootloader (HV BL) of the HV application to obtain content of specified physical address ranges, or sets of filenames and module identifiers, and computing a message digest (MD) of retrieved content of specified physical address ranges, sets of filenames and module identifiers, and storing in memory the MD with a corresponding module identifier or filename. The method further includes receiving, through a wired downloadable content or data link connector (DLC) or wireless over-the-air (OTA) connection via the I/O ports of the one or more controllers of the client, a software update. The software update includes applications updated to add new features and/or functionality, or applications updated to adapt existing software to new or different physical hardware, or applications updated to address software or hardware vulnerabilities. The method further includes causing the HV BL to launch a guest OS bootloader (guest OS BL) to load guest OS software from flash memory to random-access memory (RAM), and sending physical addresses of loaded HV software, including module identifiers and filenames, to the TA in the TZ; and for sending guest OS BL addresses of loaded guest OS software including module identifiers and filenames to the TA in the TZ; and sends from the guest OS physical addresses of loaded applications including module identifiers and filenames to the TA in the TZ. The method further includes comparing information received from the HV BL, from the guest OS BL, and from the guest OS to information in a signed manifest file. The signed manifest file includes a listing of modules, filenames, and applications packaged in the software update. The method further includes storing physical addresses of modules, filenames, and applications to memory when a comparison of the signed manifest file and the information received from the HV BL, from the guest OS BL, and from the guest OS is successful. The method further includes computing MDs of retrieved memory content and comparing the MDs to reference MDS stored in the signed manifest file. When the comparison between the information in received from the HV BL, guest OS BL and guest OS to the signed manifest file is not successful, the method causes the software update to be refused. The method further includes causing the guest OS in the non-secure world to query the TA in the TZ for a random seed or seed numbers for an ASLR permutation, and causing the TA in the TZ to utilize a reference MD from the first time running of the installation package or from the OEM signed manifest file in a verified software update to selectively accept the query. The TA in the TZ utilizes a random seed or seed numbers to generate random permutations $\pi$ and an inverse $\pi^{-1}$ of the permutations. Randomization of virtual locations of installed modules and filenames is based on the random permutations, such that physical locations are equal to the inverse $\pi^{-1}$ of runtime locations. The method further includes querying the non-secure world for memory content at physical locations identified, and comparing a MD of retrieved content to stored reference MD information. Upon not receiving a response, or upon receiving an MD of a response from the non-secure world does not match the reference MD, causing the TA in the TZ to refuse to let code in the non-secure world request operations that utilize TZ keys, and the TA in the TZ requests the HV application to reset the guest OS, or requesting the guest OS to reset a compromised application. Upon receiving a correct response, the method causes the TA in the TZ to allow the code in the non-secure world to request operations that utilize TZ keys. The method further includes accessing a reference MD from a first install or from the OEM signed manifest file, causing the TA in the TZ to query the guest OS BL or the guest OS in the non-secure world for the ASLR permutation $\pi$, and causing the TA in the TZ to use the inverse permutation $\pi^{-1}$ to determine runtime physical locations where modules, module identifiers and filenames are written. The method further includes querying the non-secure world for an MD on relevant physical memory locations, and comparing the reference MD from the first install or from the OEM signed manifest file to the MD from the non-secure world. Upon receiving no response or a response that does not match the reference MD or the OEM signed manifest file, refusing, by the TA in the TZ, to allow code in the non-secure world to request operations that utilize TZ keys, and causing the TA to request the HV application to reset the guest OS or request the guest OS to reset a compromised application or app running within the guest OS. The method further includes causing the TZ to reset the one or more controllers running the HV application based on reference software configurations stored in the TZ when the HV application is unable to reset the guest OS or request the guest OS to reset a compromised application or app running within the guest OS.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
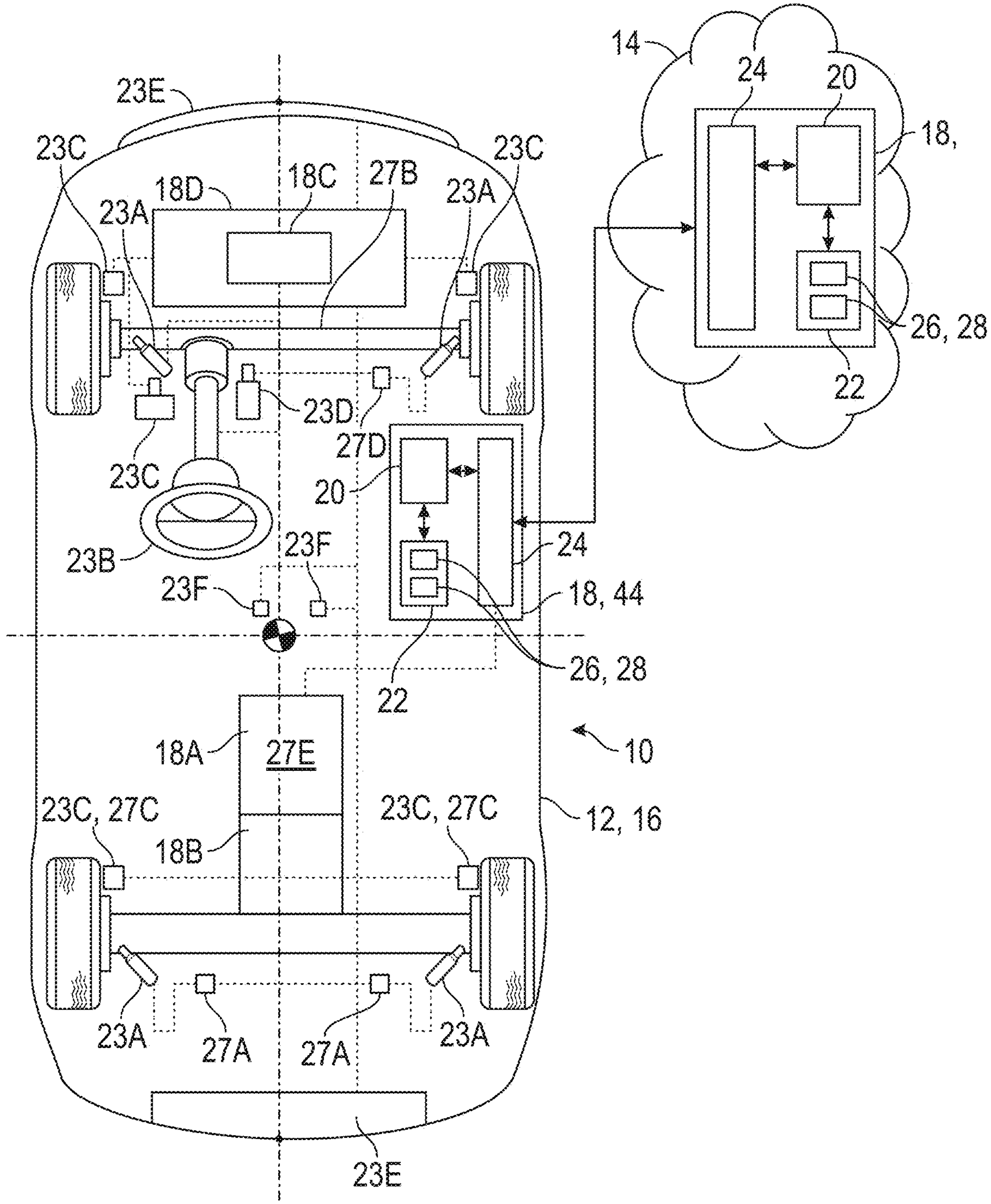
FIG. 1 is a schematic diagram of a system for remote device attestation (RDA) for operating systems (OSs) implementing address space layout randomization (ASLR) according to an exemplary embodiment.

Referring to FIG. 1, a system 10 for remote device attestation for operating systems (OSs) implementing address space layout randomization (ASLR) is shown. The system 10 may operate on a variety of different hardware platforms, including clients 12 and back-office or remote servers 14. The clients 12 may include any of a wide variety of hardware, including but not limited to: vehicles 16, cellular devices, personal computers, aircraft, watercraft, satellites, and the like. Each of the clients 12 and back-office or remote servers 14 is generally equipped with a controller 18.

The controller 18 is a non-generalized, electronic control device having a preprogrammed digital computer or processor 20, non-transitory computer readable medium or memory 22 used to store data such as control logic, software applications, instructions, computer code, data, lookup tables, etc., and a transceiver or input/output (I/O) ports 24. Computer readable medium or memory 22 includes any type of medium capable of being accessed by a computer, such as read only memory (ROM), random access memory (RAM), a hard disk drive, a compact disc (CD), a digital video disc (DVD), or any other type of memory 22. A "non-transitory" computer readable memory 22 excludes wired, wireless, optical, or other communication links that transport transitory electrical or other signals. A non-transitory computer readable memory 22 includes media where data can be permanently stored and media where data can be stored and later overwritten, such as a rewritable optical disc or an erasable memory device. Computer code includes any type of program code, including source code, object code, and executable code. The processor 20 is configured to execute the code or instructions.

Where the client 12 is a vehicle 16, the controller 18 may be a dedicated Wi-Fi controller, an engine control module 18A, a transmission control module 18B, a body control module 18C, an advanced driver assistance system (ADAS) module 18D in communication with the engine control module 18A, transmission control module 18B, body control module 18C and an infotainment control module (not specifically shown), or the like. The engine control module 18A, transmission control module 18B, body control module 18C, and ADAS module 18D communicate with a variety of on-board sensors 23 and actuators 25 to determine how the vehicle 16 is operating, and to adjust how the vehicle 16 is operating. In several aspects, the sensors 23 collect real-time static and dynamic telemetry information about the vehicle 16, including obtaining information from suspension sensors 23A, steering position sensors 23B, braking sensors 23C, throttle position sensors 23D, aerodynamic sensors 23E, attitude sensors 23F including but not limited to: gyroscopic sensors, vibration sensors, multi-axis sensors, and the like. Additional sensors 23 may be equipped to the vehicle 16 without departing from the scope or intent of the present disclosure. Actuators 25 of the vehicle 16, controlled by the various controllers 18 of the vehicle 16, are used to manipulate control devices, such as a powertrain including suspension actuators 27A, steering rack and steering actuators 27B, braking actuator 27C, throttle actuator 27D, one or more engines or motors 27E. In several aspects, via control of the actuators 27, the engine control module 18A, transmission control module 18B, body control module 18C, and ADAS module 18D, and other such modules 18 of the vehicle 16 continuously, actively, and dynamically alter static and dynamic behavior of the vehicle 16 in response to information received from the sensors 23, in response to navigation information, and in response to vehicle 16 user inputs. The transceiver or I/O ports 24 are configured to wirelessly communicate with the back-office or remote servers 14 using Wi-Fi protocols under IEEE 802.11x, cellular communications infrastructure, satellite communications systems and protocols or the like.

The client 12 further includes one or more applications 26. An application 26 is a software program configured to perform a specific function or set of functions. The application 26 may include one or more computer programs, software components, sets of instructions, procedures, functions, objects, classes, instances, related data, or a portion thereof adapted for implementation in a suitable computer readable program code. The applications 26 may be stored within the memory 22 or in additional or separate memory 22. Examples of the applications 26 include audio or video streaming services, games, browsers, social media, etc.

In order to ensure that hardware and software of the client 12 and/or back-office remote servers 14 is secure and has not been compromised or otherwise tampered with, remote device attestation (RDA) used. In microcontrollers (MCUs), software is written to specific memory locations defined by an original equipment manufacturer (OEM) in a configuration file stored in memory 22. Accordingly, content of MCU's in a particular client 12 and/or remote server 14 may be compared to reference information relating to the specific memory locations for a given software application 26 held in a library or database held by the OEM.

By contrast, in system-on-chip (SoC) applications, an operating system (OS) determines where modules and files are stored without OEM soft part release systems knowing or otherwise having direct access to this information. The OS also implements an address space layout randomization (ASLR) application or mechanism 28, which randomizes memory 22 layouts each time an application 26 or process is executed or run. Accordingly, a client's 12 memory 22 content may not easily be compared to a reference value in a system 10 having SoCs in which an OS determines memory 22 locations utilizing ASLR. The system 10 of the present disclosure operates in at least three interrelated methods for RDA in SoCs with ASLR enabled.

Figure 2:
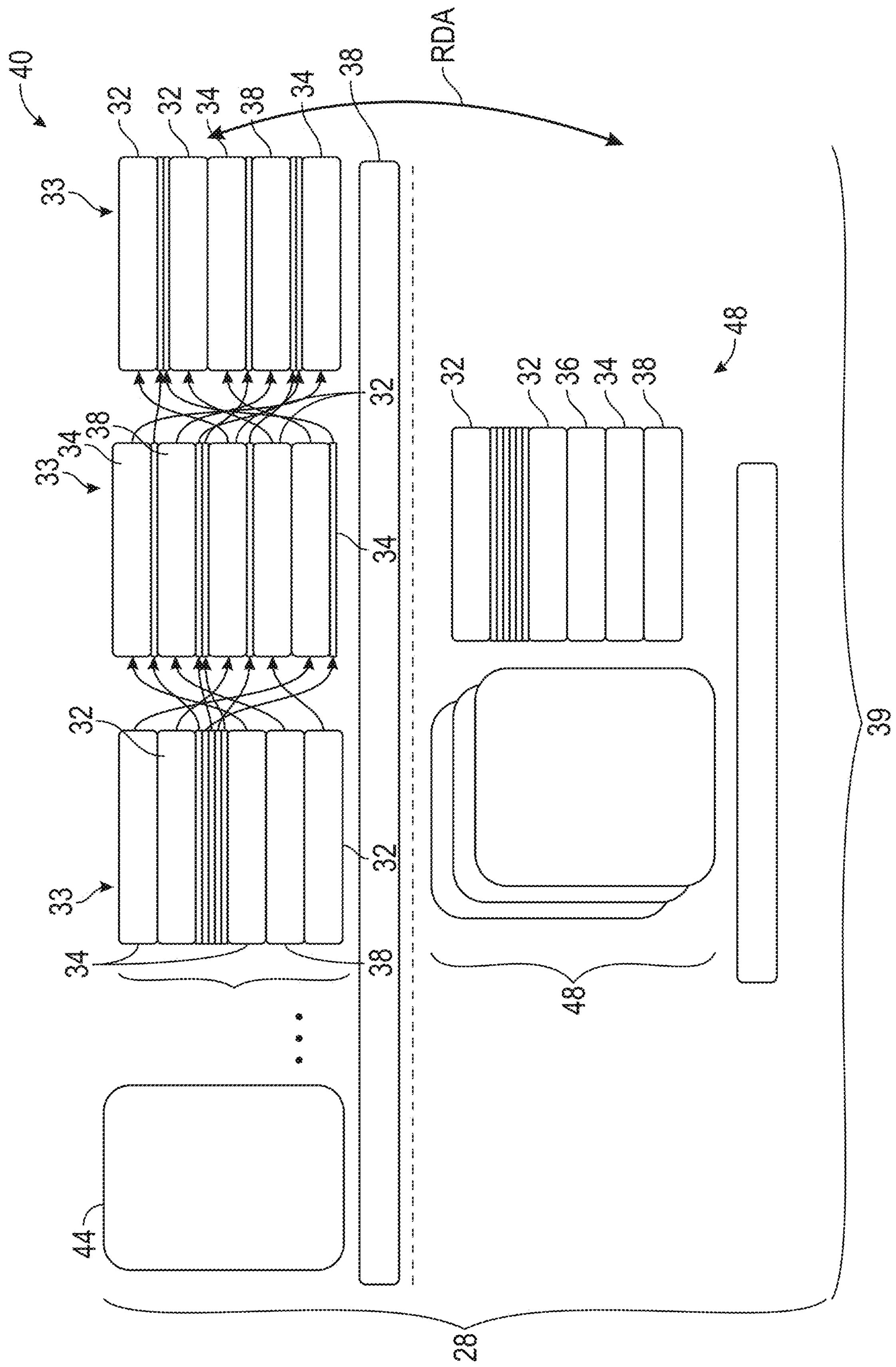
FIG. 2 is a schematic block diagram depicting a system-on-chip (SoC) application of the system of FIG. 1, including a series of initial and subsequent guest OS software application boots according to an exemplary embodiment.
Figure 3:
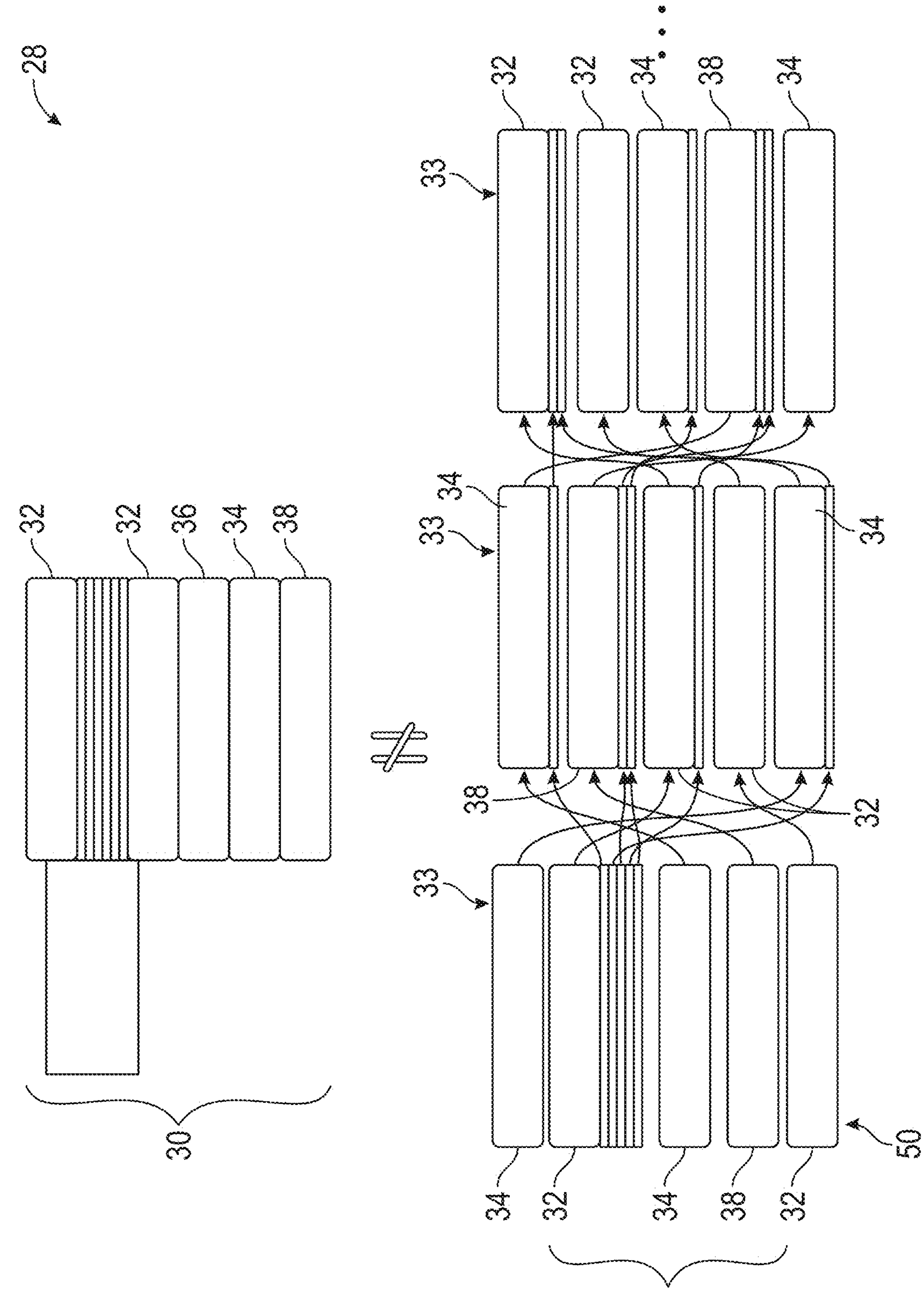
FIG. 3 is a block diagram depicting an initial software installation and subsequent boots of the software utilizing the system of FIGS. 1 and 2 according to an exemplary embodiment.

Turning now to FIGS. 2 and 3 and with continuing reference to FIG. 1, an OS utilizing an ASLR mechanism 28 for use on an SoC is shown in further detail. ASLR is a mechanism used by an OS to randomize memory 22 layout. Once the ASLR mechanism 28 is turned on or otherwise engaged, the ASLR mechanism 28 becomes native to the OS and applies to all applications 26 running on the OS. In FIG. 2, the OS utilizing the ASLR mechanism 28 is sent in an installation package 30 from an OEM to the client 12 via wired or wireless means as described above for an initial installation on the client 12. The installation package 30 includes one or more guest OS applications 32, a guest OS bootloader (BL) 34, and a guest OS 36, as well as a hypervisor (HV) application 38.

In FIGS. 2 and 3, a series of sequential initializations or boots of the guest OS applications 32 in virtual process address space 33 are shown in additional detail. The physical location where files are written is randomized only once at the time of initial installation. However, as shown in FIGS. 2 and 3, the virtual location is randomized at each initialization of the guest OS 36 or a guest OS application 32 running on the OS. That is, each of the initializations or boots of the guest OS applications 32 is randomized in virtual layout relative to prior and future boots, as well as relative to the installation package 30 sent by the OEM. The randomization of the virtual layouts of each subsequent boot ensures security and reduces the potential for tampering substantially. However, despite such randomization, verification of guest OS application 32 integrity is important to maintain client 12 reliability and data security.

FIG. 2 depicts an architecture of a typical SoC 39. The SoC 39 architecture includes a normal or non-secure world 40 and a trust zone (TZ) 42 defining a secure area. The normal or non-secure world 40 includes one or more virtual electronic control units (ECUs) 44. The ECUs 44 are virtual controllers 18, each having a processor 20, memory 22, and I/O ports 24 similar to those described above. The normal or non-secure world 40 further includes the one or more guest OS applications 32, Guest OS bootloader (BL) 34, and guest OS 36. In addition, the normal or non-secure world 40 includes an HV application 46 that may be run directly on bare metal of the SoC. The TZ 42 includes one or more trusted applications 48, as well as one or more databases of reference software packages, such as the installation package 30 referred to originally in FIG. 2.

Figure 4:
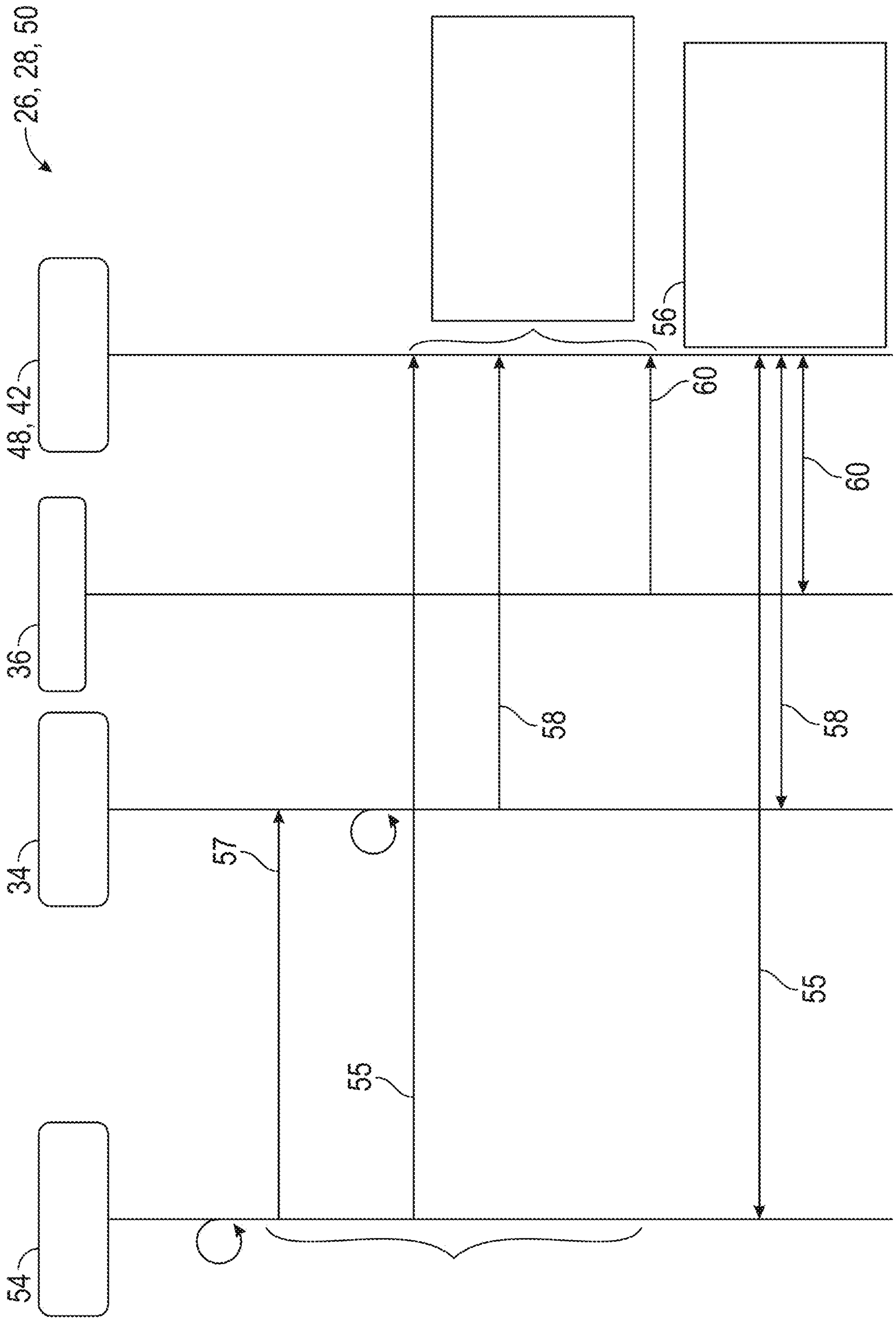
FIG. 4 is a flow diagram depicting an initial software according by an original equipment manufacturer (OEM) utilizing the system of FIGS. 1 and 2 according to an exemplary embodiment.

Turning now to FIG. 4 and with continuing reference to FIGS. 1-3, a first time software application 26 installation 50 or first start-up is shown in graphical form. The first time installation 50 is typically carried out in a trusted factory environment under OEM control. The main approach of the first-time installation 50 is to bypass ASLR and have a trusted application (TA) 48 in the TZ 42 receive the memory 22 layout of the OS 36, and in some cases the memory 22 layout of the HV application, from the bootloaders, and receive the memory 22 layout of applications 26 from the OS 36. More specifically, during a secure boot phase 52, the HV bootloader 54 launches 57 the guest OS BL 34, including loading OS 36 software from flash memory 22 to RAM memory 22. The HV bootloader 54 sends the physical addresses 55 of loaded HV software, including module identifiers, filenames, and the like to the TA 48 in the TZ 42. Likewise, the guest OS BL 34 sends the physical addresses 58 of loaded guest OS software, including module identifiers, filenames, and the like to the TA 48 in the TZ 42. Similarly, the guest OS 36 itself sends physical addresses 60 of loaded applications 26 including module identifiers, filenames, and the like to the TA 48 in the TZ 42.

The TA 48 automatically trusts received information from the HV bootloader 54, the guest OS BL 34, and the guest OS 36 at this stage because the information was provided during a secure boot phase 52. The TA 48 stores certain information as reference data, including the module identifiers, filenames, physical address locations, and the like.

Subsequently, the TA 48 computes a message digest (MD) 56 of each retrieved memory 22 content based on addresses provided by the HV bootloader 54, guest OS BL 34, and guest OS 36 stores them with a corresponding module identifier or filename reference. The TA 48 also compares the retrieved memory 22 content from the HV BL 54, guest OS BL 34, and guest OS 36 to reference MDs 56 stored in the TZ 42.

In some examples, the HV application 46 may actively and periodically request the TA 48 in the TZ 42 to verify the integrity of software in the normal or non-secure world 40. The HV application 46 may trigger integrity verification whenever a sensitive or security-critical operation is requested. In other non-limiting examples, the HV application 46 may actively, automatically, and periodically trigger the TA 48 to verify the integrity of software in the normal or non-secure world 40. The periodic triggering of the integrity verification may be based on a secure TZ 42 clock, or other such system.

More specifically, when an integrity verification is initiated, the TA 48 in the TZ 42 obtains content of specified physical address ranges in memory 22 for a set of filenames or module identifiers from the HV application 46 and the guest OS 36. When the memory 22 cannot be read or the MD 56 of retrieved content does not match reference MD 56 information stored in the TZ 42, then the TA 48 in the TZ 42 prevents normal or non-secure world 40 operations from querying the TZ 42 for operations that depend upon keys stored in the TZ 42. The TZ 42 also informs the HV application 46 of the failed verification so that the HV application 46 can reset the compromised guest OS 36, guest OS application 26 or the like. The HV application 46 is also checked for integrity, and when it is determined that the HV application 46 has been compromised itself, the TZ 42 resets the core, the central processing unit (CPU) or the entire controller 18 to OEM specifications based on the reference software configurations stored in the TZ 42. In some examples, when the HV application 46 is unable to reset the compromised guest OS 36 or guest OS application 26, the system 10 determines that the HV application 46 itself is compromised, and the TZ 42 causes the core to be reset in order to return the HV application 46 to OEM settings. In further examples, when malware or a compromise persists, despite attempts to resolve as described above, the TZ 42 holds on computing security-sensitive operations, such as generating message authentication codes (MACs). In turn, this can lead to the SoC to stop being trusted by an MCU on the client 12, especially where the client 12 is a vehicle 16 and the applications 26 are implicated in vehicle motion control (VMC). In situations where the malware or compromise persists and causes the vehicle not to operate normally, vehicle users are notified of the issue and informed of possible remediation steps.

Figure 5:
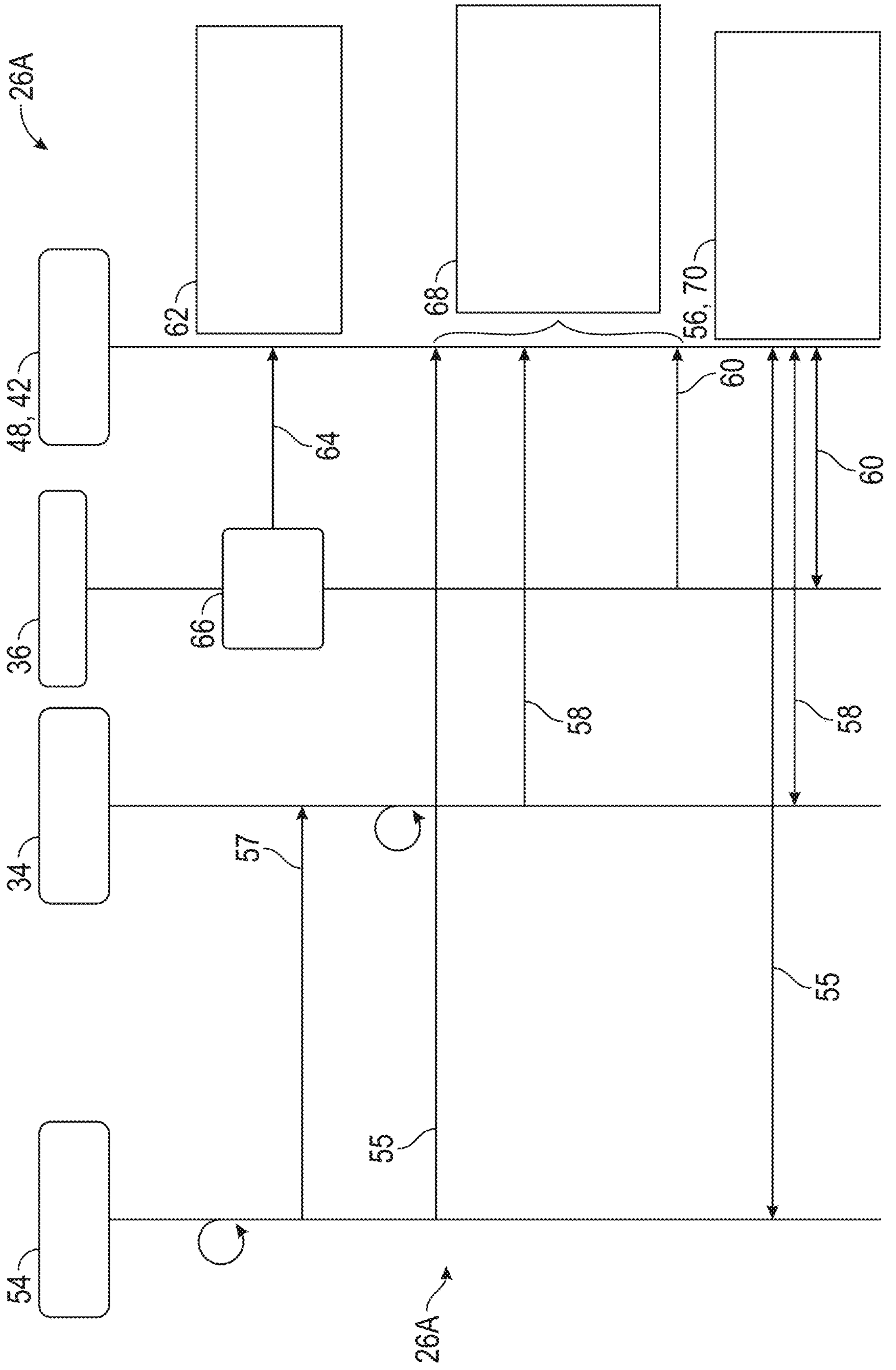
FIG. 5 is a flow diagram depicting a software update to software already installed by an OEM utilizing the system of FIGS. 1-4 according to an exemplary embodiment.

Turning now to FIG. 5 and with continuing reference to FIGS. 1-4, RDA, and more specifically, the ASLR mechanism 28 is used on subsequent software boots, and in software updates 26A as well. It will be appreciated that many types of applications 26 are periodically updated to add new features and/or functionality, to adapt existing software applications 26 to new or different physical hardware, to adapt existing software applications 26 to software and/or hardware vulnerabilities as such vulnerabilities are identified. Accordingly, the ASLR mechanism 28 of the present disclosure is also used for RDA during updates to system 10 software.

As shown in the non-limiting example of FIG. 5, when a software update 26A is performed in a non-trusted environment either over-the-air (OTA) or through a wired downloadable content or data link connector (DLC) port connection, the HV BL 54 launches 57 the guest OS BL 34, and loads the guest OS software from flash memory 22 to RAM. In addition, at block 62, the TA 48 in the TZ 42 receives a signed manifest file 64 from a software updater module 66 executed within the guest OS 36. The signed manifest file 64 includes a signature, a not before ID (NBID) or other such version counter, target hardware and/or software to be updated, and the like. The HV BL 54 also sends physical addresses of loaded HV software 55, including module identifiers and filenames, to the TA 48 in the TZ 42. Similarly, the guest OS BL 34 sends the addresses 58 of loaded guest OS software, including module identifiers and filenames, to the TA 48 in the TZ 42. The guest OS 36 also sends physical addresses 60 of loaded applications 26, including module identifiers and filenames, to the TA 48 in the TZ 42. The TA 48, at block 68 subsequently compares the information received from the HV BL 54, guest OS BL 34, and guest OS 36 to information in the signed manifest file 64. The signed manifest file 64 is a listing of the modules, filenames, and applications 26 included in, or otherwise packaged within the software update 26A to be applied. When the comparison is successful, the system 10, and more specifically the TA 48 in the TZ 42 stores the physical addresses of modules, filenames, and applications 26 to memory 22. The TA 48 in the TZ 42 then computes MDs 56 of retrieved memory 22 content and compares the computed MDs 56 to reference MDs 56 in the signed manifest file 64 at block 70.

In a manner substantially similar to that of an initial boot installation, the software update 26A the HV application 46 may periodically request the TA 48 in the TZ 42 to verify the integrity of updated software in the normal or non-secure world 40. The HV application 46 may trigger integrity verification whenever a sensitive or security-critical operation is requested. In other non-limiting examples, the HV application 46 may actively, automatically, and periodically trigger the TA 48 to verify the integrity of software in the normal or non-secure world 40. The periodic triggering of the integrity verification may be based on a secure TZ 42 clock, or other such system.

More specifically, when an integrity verification is initiated, the TA 48 in the TZ 42 obtains content of specified physical address ranges in memory 22 or for a set of filenames or module identifiers from the HV application 46 and the guest OS 36. When the memory 22 cannot be read or the MD 56 of retrieved content does not match reference MD 56 information stored in the TZ 42, then the TA 48 in the TZ 42 prevents normal or non-secure world 40 operations from querying the TZ 42 for operations that depend upon keys stored in the TZ 42. The TZ 42 also informs the HV application 46 of the failed verification so that the HV application 46 can reset the compromised guest OS 36, guest OS application 26 or the like. The HV application 46 is also checked for integrity, and when it is determined that the HV application 46 has been compromised itself, the TZ 42 resets the core, the core, the central processing unit (CPU) or the entire controller 18 to OEM specifications based on the reference software configurations stored in the TZ 42. In some examples, when the HV application 46 is unable to reset the compromised guest OS 36 or guest OS application 26, the system 10 determines that the HV application 46 itself is compromised, and the TZ 42 causes the core to be reset in order to return the HV application 46 to OEM settings. In further examples, when malware or a compromise persists, despite attempts to resolve as described above, the TZ 42 holds on computing security-sensitive operations, such as generating MACs. In turn, this can lead to the SoC to stop being trusted by an MCU on the client 12, especially where the client 12 is a vehicle and the applications 26 are implicated in vehicle motion control (VMC). In situations where the malware or compromise persists and causes the vehicle not to operate normally, vehicle users are notified of the issue and informed of possible remediation steps.

Figure 6:
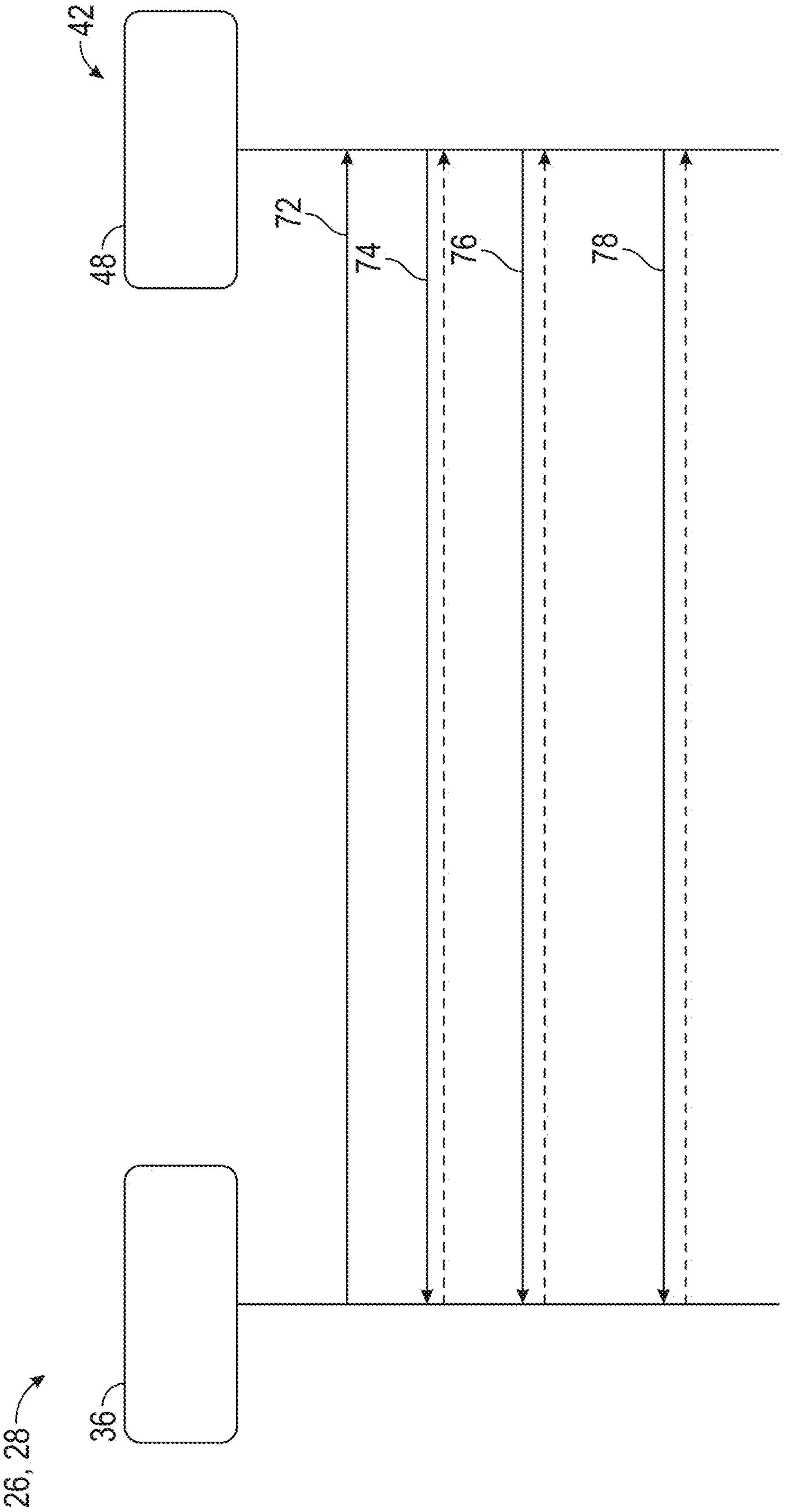
FIG. 6 is a flow diagram depicting an application executed in a non-secure world and requesting information from a trusted application in a trusted zone of the system of FIGS. 1-5 according to an exemplary embodiment.

Turning now to FIG. 6, and with continuing reference to FIGS. 1-5, the RDA process carried out by the ASLR mechanism 28 of the present disclosure is shown in additional detail. The guest OS 36 in the normal or non-secure world 40 queries 72 the TA 48 in the TZ 42 for a random seed or seed numbers for an ASLR permutation. In order for the query 72 to be accepted by the TA 48 in the TZ 42, the TA 48 utilizes a reference MD 56 from the first installation or from an OEM-signed manifest file 64 from a verified software update 26A. The TA 48 in the TZ 42 uses the random seed or seed numbers 74 to generate a random permutation $\pi$ and its inverse $\pi^{-1}$. The TA 48 in the TZ 42 then queries the normal or non-secure world 40 for the memory 22 locations of installed modules and filenames and retrieves the randomized virtual locations of these memory 22 locations. The TA 48 determines corresponding physical locations 76 of memory 22 locations, where physical Locations=$\pi^{-1}$ (runtime locations), and queries 78 the normal or non-secure world 40 for memory 22 content at the physical locations identified, and compares the MD 56 of retrieved content to stored reference MD 56 information. When the system 10 receives a correct response and the MD 56 of the response from the normal or non-secure world 40 matches the reference MD 56 stored in the TZ 42, the TA 48 in the TZ 42 allows the code in the normal or non-secure world 40 to request operations that utilize TZ 42 keys. However, when the system 10 does not receive a response, the MD 56 of a response from the normal or non-secure world 40 does not match the reference MD 56 stored in the TZ 42, the TA 48 in the TZ 42 refuses to let code in the normal or non-secure world 40 to request operations that utilize TZ 42 keys. The TA 48 in the TZ 42 then requests the HV application 46 to reset the compromised guest OS 36 or requests the guest OS 36 to reset a compromised application 26. In some circumstances, the HV application 46 may not be able to reset the compromised guest OS 36 or the guest OS 36 may not be able to reset a compromised application 26. When the HV application 46 or guest OS 36 cannot reset the compromised guest OS 36 or compromised application 26, the system 10 assumes the HV application 46 itself is corrupt or compromised, and the TZ 42 resets the core, the CPU or the entire controller 18 to OEM specifications based on the reference software configurations stored in the TZ 42.

Figure 7:
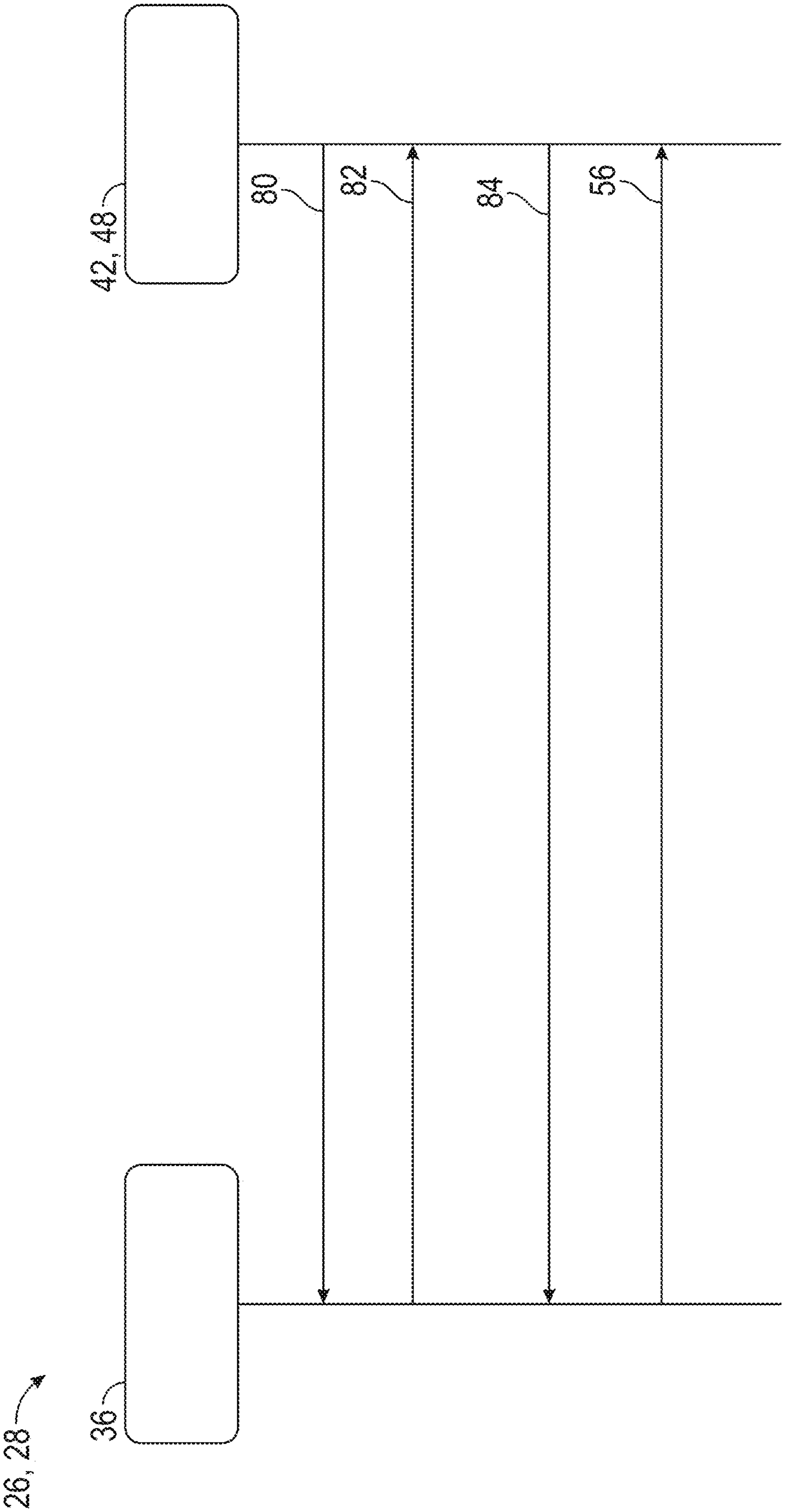
FIG. 7 is a flow diagram depicting a trusted app in the trust zone verifying the integrity of the guest OS or a guest application executed in the non-secure world of FIG. 6 according to an exemplary embodiment.

Turning now to FIG. 7, and with continuing reference to FIGS. 1-6, the system 10 may operate to have the TA 48 in the TZ 42 query 80 the normal or non-secure world 40 for the ASLR permutation. In several aspects, in order for the TA 48 in the TZ to query 80 the normal or non-secure world 40 for the ASLR permutation, the TA 48 has a reference MD 56 from a first install, or from an OEM-signed manifest file 64. Utilizing the MD 56, the TA 48 in the TZ 42 queries 82 the guest OS BL 34, the guest OS 36, or the like for the ASLR permutation rt. Using the inverse permutation $\pi^{-1}$, the system 10 determines the runtime physical memory 22 locations where modules, module identifiers, and filenames are written. The TA 48 then queries 84 the normal or non-secure world 40 for an MD 56 on relevant physical memory 22 locations. The TA 48 then compares responses received from the normal or non-secure world 40 to the MD 56 or OEM-signed manifest file 64. In some situations, the TA 48 may receive no response, or a response that does not match the reference MD 56 or OEM-signed manifest file 64. When the response does not match, the TA 48 refuses to allow the normal or non-secure world 40 code to request operations that utilize TZ 42 keys. Subsequently, the TA 48 requests the HV application 46 to reset the compromised guest OS 36 or request the guest OS 36 to reset a compromised application or app 26 running within the guest OS 36. However, if the HV application 46 is, for some reason, unable to reset the compromised guest OS 36 or guest application 26, the HV application 46 itself may be compromised. When the HV application 46 is determined to have been compromised, the TZ 42 resets the core, the CPU, or the entire controller 18 to OEM specifications based on the reference software configurations stored in the TZ 42.

It will be appreciated from the foregoing description, that the system 10 of the present disclosure may operate in and/or on a variety of different platforms. In a non-limiting example in which the client 12 is a vehicle, and the applications 26 being managed by the system 10 are utilized in VMC processes, ADAS processes, navigation processes, and the like, the system 10 offers several advantages. Through use of the system 10, updates to software applications 26 that are used to control VMC, ADAS and/or navigation processes are monitored for potentially malicious activity, and for possible compromise. Accordingly, at initial installation, during software application 26 and hardware updates, and each time applications 26 used in VMC processes, ADAS processes, navigation processes and the like are executed, the system 10 verifies whether malware or compromise exists or is persisting, and either allows the vehicle to operate normally when no issues are detected, or notifies vehicle users of an issue and prevents the potentially compromised applications 26 for VMC, ADAS, navigation control, or the like from executing and diminishes vehicle function. In such circumstances when a compromise is detected, vehicle users are also informed of possible remediation steps, including being directed to reinstall software, refrain from operating the vehicle or a particular vehicle subsystem that has been compromised, and/or being directed to contact a service center to have the vehicle serviced and the compromise in the vehicle addressed and corrected. In some more specific non-limiting examples, when a compromise is detected in a In additional examples, the compromise may originate in an application 26 accessed through the infotainment system, a communications system of the vehicle, or the like, and remediation steps taken by the system 10 may include disabling of a wireless or wired communications application 26 that a vehicle user would normally use to connect a third-party cellular device, or the like, to the vehicle for navigation, infotainment, or the like.

In a further example, during client 12 manufacturing, one or more controllers 18 or cartridges containing software may be applied to the client 12, or otherwise plugged into an exemplary vehicle. MCUs of the vehicle will challenge or otherwise verify the cartridge or controllers 18 plugged into the exemplary vehicle to verify that the cartridge or controllers 18 are properly applicable to the client 12 or exemplary vehicle, according to the description of the system 10 above. When the cartridge or controller 18 is properly verified, the system 10 allows software or information in the cartridge or controller 18 to run, and when the verification or challenge fails, the system 10 prevents execution of applications 26 or software stored in the cartridge or controller 18.

A system 10 and methods according to the present disclosure offer several advantages. These include improving security, efficient, lightweight design, compatibility in a variety of different technological fields and for a variety of different hardware and software applications, and scalability. The system 10 and methods of the present disclosure offer improved security by bypassing ASLR, and allowing for more accurate memory 22 content comparison. By obtaining memory 22 layout information directly from the operating system (OS) and applications 26, the system 10 reduces the computational resource impacts of randomization introduced by ASLR, while maintaining or improving security. Likewise, the use of a TZ 42 ensures that reference MDs 56 are securely stored and compared, enhancing overall security. Furthermore, the system 10 and methods herein are agnostic of, and do not necessarily rely upon complex cryptographic protocols or heavy computations. By contrast, the system 10 and methods of the present disclosure compute MDs 56 based on specified addresses, thereby minimizing computational overhead while achieving reliable attestation. The lightweight nature of the approach makes it suitable for resource-constrained devices. The system 10 and methods herein offer compatibility not only with MCUs, but with SoCs implementing ASLR, regardless of the specific OS or application 26 stack. The system 10 and methods do not require modifications to existing software or hardware components. Accordingly, the system 10 may be integrated or otherwise implemented into various internet of things (IoT) devices, embedded systems, mobile platforms, and the like. The system 10 and methods herein also offer scalability by allowing for simplified and efficient handling of attestation requests from a large number of devices, and without compromising security.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for remote device attestation (RDA) for operating systems implementing address space layout randomization (ASLR), the system comprising:

one or more controllers of a client, each of the one or more controllers having a processor, a memory, and input/output (I/O) ports;

one or more remote servers, each of the one or more remote servers having a processor, a memory, and I/O ports, the I/O ports of the one or more controllers in communication with the one or more I/O ports of the one or more remote servers, the memories of the each of the one or more controllers and the one or more remote servers storing programmatic control logic, including an ASLR mechanism for RDA, the ASLR mechanism comprising:

a trust zone (TZ) defining a secure area and having a secure operating system (OS) and one or more trusted applications (TAs); and a non-secure world having:

one or more virtual controllers, each having memory, processors, and I/O ports, the I/O ports of the non-secure world in communication with the TZ, and with one or more control systems of a vehicle; and a hypervisor (HV) application in communication with the OS and TAs in the TZ, wherein the ASLR mechanism further comprises:

a first control logic for verifying integrity of applications running in the non-secure world on a first time installation, or a first start-up;

a second control logic for verifying integrity of the applications running in the non-secure world during an update to the applications; and a third control logic for actively and automatically verifying integrity of applications running in the non-secure world during application use, wherein when integrity verification fails, the ASLR mechanism prevents the applications that have failed integrity verification from operating for vehicle motion control (VMC), advanced driver assistance system (ADAS) functionality, and navigation control from executing, thereby diminishing vehicle function.

2. The system of claim 1, wherein the first control logic further comprises:

control logic for bypassing ASLR and for receiving in a trusted environment of an original equipment manufacturer (OEM), via a wired or wireless connection by the one or more controllers of the client, an installation package including:

having one or more TAs in the TZ receive memory layouts of a guest OS, memory layout of the HV application, memory layouts of boot loaders and memory layouts of applications from the guest OS;

control logic for causing the TA to trust the installation package because the installation package was received in a trusted OEM controlled environment; and control logic for executing or running for a first time the installation package and randomizing a memory layout of the one or more controllers of the client during execution of the installation package.

3. The system of claim 2, wherein the first control logic further comprises:

control logic for storing a module identifier, a filename, and physical addresses of program files resulting from execution of the installation package on the one or more controllers of the client;

control logic for querying a hypervisor bootloader (HV BL) of the HV application to obtain content of specified physical address ranges, or sets of filenames and module identifiers; and control logic for computing a message digest (MD) of retrieved content of specified physical address ranges, sets of filenames and module identifiers, and storing in memory the MD with a corresponding module identifier or filename.

4. The system of claim 3, wherein the second control logic further comprises:

control logic for receiving, through a wired downloadable content or data link connector (DLC) or wireless over-the-air (OTA) connection via the I/O ports of the one or more controllers of the client, a software update, wherein the software update includes applications updated to add new features and/or functionality, or applications updated to adapt existing software to new or different physical hardware, or applications updated to address software or hardware vulnerabilities;

control logic for causing the HV BL to launch a guest OS bootloader (guest OS BL) to load guest OS software from flash memory to random-access memory (RAM); and control logic for sending physical addresses of loaded HV software, including module identifiers and filenames, to the TA in the TZ; and for sending guest OS BL addresses of loaded guest OS software including module identifiers and filenames to the TA in the TZ; and for sending from the guest OS physical addresses of loaded applications including module identifiers and filenames to the TA in the TZ.

5. The system of claim 4, wherein the second control logic further comprises:

control logic for comparing information received from the HV BL, from the guest OS BL, and from the guest OS to information in a signed manifest file, wherein the signed manifest file includes a listing of modules, filenames, and applications packaged in the software update; and executing control logic for storing physical addresses of modules, filenames, and applications to memory when a comparison of the signed manifest file and the information received from the HV BL, from the guest OS BL, and from the guest OS is successful; and control logic for computing MDs of retrieved memory content and comparing the MDs to reference MDS stored in the signed manifest file, wherein when the comparison between the information in received from the HV BL, guest OS BL and guest OS to the signed manifest file is not successful, refusing the software update.

6. The system of claim 5, wherein the second control logic further comprises:

control logic for causing the guest OS in the non-secure world to query the TA in the TZ for a random seed or seed numbers for an ASLR permutation;

control logic for causing the TA in the TZ to utilize a reference MD from the first time running of the installation package or from the OEM signed manifest file in a verified software update to selectively accept the query; and wherein the TA in the TZ utilizes a random seed or seed numbers to generate random permutations $\pi$ and an inverse $\pi^{-1}$ of the permutations, wherein randomization of virtual locations of installed modules and filenames is based on the random permutations, such that physical locations are equal to the inverse $\pi^{-1}$ of runtime locations.

7. The system of claim 6, wherein the second control logic further comprises:

control logic for querying the non-secure world for memory content at physical locations identified; and control logic for comparing a MD of retrieved content to stored reference MD information; and when the system does not receive a response, or the MD of a response from the non-secure world does not match the reference MD, the TA in the TZ refuses to let code in the non-secure world request operations that utilize TZ keys, and the TA in the TZ requests the HV application to reset the guest OS, or requests the guest OS to reset a compromised application, and when the system receives a correct response, the TA in the TZ allows the code in the non-secure world to request operations that utilize TZ keys.

8. The system of claim 6, wherein the third control logic further comprises:

control logic for accessing a reference MD from a first install or from the OEM signed manifest file;

control logic for causing the TA in the TZ to query the guest OS BL or the guest OS in the non-secure world for the ASLR permutation $\pi$;

control logic for causing the TA in the TZ to use the inverse permutation $\pi^{-1}$ to determine runtime physical locations where modules, module identifiers and filenames are written;

control logic for querying the non-secure world for an MD on relevant physical memory locations; and control logic for comparing the reference MD from the first install or from the OEM signed manifest file to the MD from the non-secure world.

9. The system of claim 8, wherein when the TA in the TZ receives no response or a response that does not match the reference MD or the OEM signed manifest file, the TA refuses to allow code in the non-secure world to request operations that utilize TZ keys, and the TA requests the HV application to reset the guest OS or request the guest OS to reset a compromised application or app running within the guest OS.

10. The system of claim 9, wherein when the HV application is unable to reset the guest OS or request the guest OS to reset a compromised application or app running within the guest OS, the TZ resets to OEM specifications the one or more controllers running the HV application based on reference software configurations stored in the TZ.

11. A method for remote device attestation (RDA) for operating systems implementing address space layout randomization (ASLR), the method comprising:

utilizing one or more controllers of a client, each of the one or more controllers having a processor, a memory, and input/output (I/O) ports;

utilizing one or more remote servers, each of the one or more remote servers having a processor, a memory, and I/O ports, the I/O ports of the one or more controllers in communication with the one or more I/O ports of the one or more remote servers, the memories of the each of the one or more controllers and the one or more remote servers storing programmatic control logic, including an ASLR mechanism for RDA, the ASLR mechanism comprising:

a trust zone (TZ) defining a secure area and having a secure operating system (OS) and one or more trusted applications (TAs); and a non-secure world having:

one or more virtual controllers, each having memory, processors, and I/O ports, the I/O ports of the non-secure world in communication with the TZ, and with one or more control systems of a vehicle; and a hypervisor (HV) application in communication with the OS and TAs in the TZ, wherein the ASLR mechanism further comprises:

a first control logic for verifying integrity of applications running in the non-secure world on a first time installation, or a first start-up;

a second control logic for verifying integrity of the applications running in the non-secure world during an update to the applications; and a third control logic for actively and automatically verifying integrity of applications running in the non-secure world during application use, wherein when integrity verification fails, preventing via the ASLR mechanism, the applications that have failed integrity verification from operating for vehicle motion control (VMC), advanced driver assistance system (ADAS) functionality, and navigation control from executing, thereby diminishing vehicle function.

12. The method of claim 11, further comprising:

bypassing ASLR and receiving in a trusted environment of an original equipment manufacturer (OEM), via a wired or wireless connection by the one or more controllers of the client, an installation package including:

having one or more TAs in the TZ receive memory layouts of a guest OS, memory layout of the HV application, memory layouts of boot loaders and memory layouts of applications from the guest OS;

causing the TA to trust the installation package because the installation package was received in a trusted OEM controlled environment; and executing or running for a first time the installation package and randomizing a memory layout of the one or more controllers of the client during execution of the installation package.

13. The method of claim 12, further comprising:

storing a module identifier, a filename, and physical addresses of program files resulting from execution of the installation package on the one or more controllers of the client;

querying a hypervisor bootloader (HV BL) of the HV application to obtain content of specified physical address ranges, or sets of filenames and module identifiers; and computing a message digest (MD) of retrieved content of specified physical address ranges, sets of filenames and module identifiers, and storing in memory the MD with a corresponding module identifier or filename.

14. The method of claim 13, further comprising:

receiving, through a wired downloadable content or data link connector (DLC) or wireless over-the-air (OTA) connection via the I/O ports of the one or more controllers of the client, a software update, wherein the software update includes applications updated to add new features and/or functionality, or applications updated to adapt existing software to new or different physical hardware, or applications updated to address software or hardware vulnerabilities;

causing the HV BL to launch a guest OS bootloader (guest OS BL) to load guest OS software from flash memory to random-access memory (RAM); and sending physical addresses of loaded HV software, including module identifiers and filenames, to the TA in the TZ; and for sending guest OS BL addresses of loaded guest OS software including module identifiers and filenames to the TA in the TZ; and for sending from the guest OS physical addresses of loaded applications including module identifiers and filenames to the TA in the TZ.

15. The method of claim 14, further comprising:

comparing information received from the HV BL, from the guest OS BL, and from the guest OS to information in a signed manifest file, wherein the signed manifest file includes a listing of modules, filenames, and applications packaged in the software update; and storing physical addresses of modules, filenames, and applications to memory when a comparison of the signed manifest file and the information received from the HV BL, from the guest OS BL, and from the guest OS is successful; and computing MDs of retrieved memory content and comparing the MDs to reference MDS stored in the signed manifest file, wherein when the comparison between the information in received from the HV BL, guest OS BL and guest OS to the signed manifest file is not successful, refusing the software update.

16. The method of claim 15, further comprising:

causing the guest OS in the non-secure world to query the TA in the TZ for a random seed or seed numbers for an ASLR permutation; and causing the TA in the TZ to utilize a reference MD from the first time running of the installation package or from the OEM signed manifest file in a verified software update to selectively accept the query, wherein the TA in the TZ utilizes a random seed or seed numbers to generate random permutations $\pi$ and an inverse $\pi^{-1}$ of the permutations, wherein randomization of virtual locations of installed modules and filenames is based on the random permutations, such that physical locations are equal to the inverse $\pi^{-1}$ of runtime locations.

17. The method of claim 16, further comprising:

querying the non-secure world for memory content at physical locations identified; and comparing a MD of retrieved content to stored reference MD information; and wherein upon not receiving a response, or upon receiving an MD of a response from the non-secure world does not match the reference MD, causing the TA in the TZ to refuse to let code in the non-secure world request operations that utilize TZ keys, and the TA in the TZ requests the HV application to reset the guest OS, or requesting the guest OS to reset a compromised application, and upon receiving a correct response, causing the TA in the TZ to allow the code in the non-secure world to request operations that utilize TZ keys.

18. The method of claim 16, further comprising:

accessing a reference MD from a first install or from the OEM signed manifest file;

causing the TA in the TZ to query the guest OS BL or the guest OS in the non-secure world for the ASLR permutation $\pi$;

causing the TA in the TZ to use the inverse permutation $\pi^{-1}$ to determine runtime physical locations where modules, module identifiers and filenames are written;

querying the non-secure world for an MD on relevant physical memory locations; and comparing the reference MD from the first install or from the OEM signed manifest file to the MD from the non-secure world.

19. The method of claim 18, wherein:

upon receiving no response or a response that does not match the reference MD or the OEM signed manifest file, refusing, by the TA in the TZ, to allow code in the non-secure world to request operations that utilize TZ keys, and causing the TA to request the HV application to reset the guest OS or request the guest OS to reset a compromised application or app running within the guest OS; and causing the TZ to reset the one or more controllers running the HV application based on reference software configurations stored in the TZ when the HV application is unable to reset the guest OS or request the guest OS to reset a compromised application or app running within the guest OS.

20. A method for remote device attestation (RDA) for operating systems implementing address space layout randomization (ASLR), the method comprising:

utilizing one or more controllers of a client, each of the one or more controllers having a processor, a memory, and input/output (I/O) ports;

utilizing one or more remote servers, each of the one or more remote servers having a processor, a memory, and I/O ports, the I/O ports of the one or more controllers in communication with the one or more I/O ports of the one or more remote servers, the memories of the each of the one or more controllers and the one or more remote servers storing programmatic control logic, including an ASLR mechanism or application for RDA, the ASLR mechanism or application comprising:

a trust zone (TZ) defining a secure area and having a secure operating system (OS) and one or more trusted applications (TAs);

a non-secure world having:

one or more virtual controllers, each having memory, processors, and I/O ports, the I/O ports of the non-secure world in communication with the TZ, and with one or more control systems of a vehicle;

a hypervisor (HV) application in communication with the OS and TAs in the TZ, wherein the ASLR mechanism further comprises:

a first control logic for verifying integrity of applications running in the non-secure world on a first time installation, or a first start-up;

a second control logic for verifying integrity of the applications running in the non-secure world during an update to the applications;

a third control logic for actively and automatically verifying integrity of applications running in the non-secure world during application use, wherein when integrity verification fails, the ASLR mechanism prevents the applications that have failed integrity verification from operating for vehicle motion control (VMC), advanced driver assistance system (ADAS) functionality, and navigation control from executing, thereby diminishing vehicle function;

bypassing ASLR and receiving in a trusted environment of an original equipment manufacturer (OEM), via a wired or wireless connection by the one or more controllers of the client, an installation package including:

having one or more TAs in the TZ receive memory layouts of a guest OS, memory layout of the HV application, memory layouts of boot loaders and memory layouts of applications from the guest OS;

causing the TA to trust the installation package because the installation package was received in a trusted OEM controlled environment;

executing or running for a first time the installation package and randomizing a memory layout of the one or more controllers of the client during execution of the installation package;

storing a module identifier, a filename, and physical addresses of program files resulting from execution of the installation package on the one or more controllers of the client;

querying a hypervisor bootloader (HV BL) of the HV application to obtain content of specified physical address ranges, or sets of filenames and module identifiers;

computing a message digest (MD) of retrieved content of specified physical address ranges, sets of filenames and module identifiers, and storing in memory the MD with a corresponding module identifier or filename;

receiving, through a wired downloadable content or data link connector (DLC) or wireless over-the-air (OTA) connection via the I/O ports of the one or more controllers of the client, a software update, wherein the software update includes applications updated to add new features and/or functionality, or applications updated to adapt existing software to new or different physical hardware, or applications updated to address software or hardware vulnerabilities;

causing the HV BL to launch a guest OS bootloader (guest OS BL) to load guest OS software from flash memory to random-access memory (RAM);

sending physical addresses of loaded HV software, including module identifiers and filenames, to the TA in the TZ; and for sending guest OS BL addresses of loaded guest OS software including module identifiers and filenames to the TA in the TZ; and for sending from the guest OS physical addresses of loaded applications including module identifiers and filenames to the TA in the TZ;

comparing information received from the HV BL, from the guest OS BL, and from the guest OS to information in a signed manifest file, wherein the signed manifest file includes a listing of modules, filenames, and applications packaged in the software update;

storing physical addresses of modules, filenames, and applications to memory when a comparison of the signed manifest file and the information received from the HV BL, from the guest OS BL, and from the guest OS is successful;

computing MDs of retrieved memory content and comparing the MDs to reference MDS stored in the signed manifest file, wherein when the comparison between the information in received from the HV BL, guest OS BL and guest OS to the signed manifest file is not successful, refusing the software update;

causing the guest OS in the non-secure world to query the TA in the TZ for a random seed or seed numbers for an ASLR permutation;

causing the TA in the TZ to utilize a reference MD from the first time running of the installation package or from the OEM signed manifest file in a verified software update to selectively accept the query, wherein the TA in the TZ utilizes a random seed or seed numbers to generate random permutations $\pi$ and an inverse $\pi^{-1}$ of the permutations, wherein randomization of virtual locations of installed modules and filenames is based on the random permutations, such that physical locations are equal to the inverse $\pi^{-1}$ of runtime locations;

querying the non-secure world for memory content at physical locations identified;

comparing a MD of retrieved content to stored reference MD information;

wherein upon not receiving a response, or upon receiving an MD of a response from the non-secure world does not match the reference MD, causing the TA in the TZ to refuse to let code in the non-secure world request operations that utilize TZ keys, and the TA in the TZ requests the HV application to reset the guest OS, or requesting the guest OS to reset a compromised application, and upon receiving a correct response, causing the TA in the TZ to allow the code in the non-secure world to request operations that utilize TZ keys;

accessing a reference MD from a first install or from the OEM signed manifest file;

causing the TA in the TZ to query the guest OS BL or the guest OS in the non-secure world for the ASLR permutation $\pi$;

causing the TA in the TZ to use the inverse permutation $\pi^{-1}$ to determine runtime physical locations where modules, module identifiers and filenames are written;

querying the non-secure world for an MD on relevant physical memory locations;

comparing the reference MD from the first install or from the OEM signed manifest file to the MD from the non-secure world;

upon receiving no response or a response that does not match the reference MD or the OEM signed manifest file, refusing, by the TA in the TZ, to allow code in the non-secure world to request operations that utilize TZ keys, and causing the TA to request the HV application to reset the guest OS or request the guest OS to reset a compromised application or app running within the guest OS; and causing the TZ to reset the one or more controllers running the HV application based on reference software configurations stored in the TZ when the HV application is unable to reset the guest OS or request the guest OS to reset a compromised application or app running within the guest OS.

* * * * *